United States Patent [19]

Usui et al.

[11] Patent Number: 5,182,250

[45] Date of Patent: Jan. 26, 1993

[54] CATALYST COMPOSITION FOR HYDRODESULFURIZATION OF HYDROCARBON OIL AND PROCESS FOR PRODUCING THE SAME

[75] Inventors: Kazushi Usui, Chiba; Takashi Fujikawa; Katsuyoshi Ohki, both of Saitama, all of Japan

[73] Assignees: Cosmo Research Institute; Cosmo Oil Co., Ltd., both of Tokyo, Japan

[21] Appl. No.: 674,251

[22] Filed: Mar. 25, 1991

[30] Foreign Application Priority Data

Mar. 23, 1990 [JP] Japan .................................. 2-74622
Apr. 25, 1990 [JP] Japan .................................. 2-109295

[51] Int. Cl.$^5$ .................. B01J 37/04; B01J 23/85; B01J 23/64; B01J 21/06
[52] U.S. Cl. ........................... 502/314; 502/254; 502/309; 502/308; 502/204; 502/306
[58] Field of Search ............. 502/314, 254, 309, 308, 502/209, 306

[56] References Cited

U.S. PATENT DOCUMENTS

| | | | |
|---|---|---|---|
| 3,900,430 | 8/1975 | Beaty ................................... | 502/314 |
| 3,933,685 | 1/1976 | Madderra ............................ | 502/322 |
| 4,012,340 | 3/1977 | Morimoto .......................... | 502/314 |
| 4,018,672 | 4/1972 | Moser ................................. | 502/314 X |
| 4,018,714 | 4/1977 | Wilson et al. ..................... | 502/314 X |
| 4,820,680 | 4/1989 | Kemp ................................. | 502/314 |
| 4,837,193 | 6/1989 | Akizuki et al. ................... | 502/314 X |

FOREIGN PATENT DOCUMENTS 0013980  8/1980  European Pat. Off. .

*Primary Examiner*—W. J. Shine
*Assistant Examiner*—Douglas J. McGinty
*Attorney, Agent, or Firm*—Sughrue, Mion, Zinn, Macpeak & Seas

[57] ABSTRACT

A catalyst composition for the hydrodesulfurization of a hydrocarbon oil, comprising a composite of metal oxides comprising:

aluminum; and at least one metal selected from a group consisting of
(A) at least one metal belonging to Group VIB of the Periodic Table; and
(B) at least one the metal belonging to Group VIII of the Periodic Table;
where the at least one metal belonging to Group VIB of the Periodic Table accounts for, in terms of as oxide, from 10 to 60% by weight with respect to the total catalyst, and the at least one metal belonging to Group VIII of the Periodic Table accounts for, in terms of oxide, from 3 to 20% by weight with respect to the total catalyst; and a process for producing a catalyst composition for the hydrodesulfurization of a hydrocarbon oil comprising a composite of a metal oxide containing aluminum, at least one metal belonging to Group VIB of the Periodic Table, and at least one metal belonging to Group VIII of the Periodic Table, which comprises:

drying and thereafter calcining an effective component obtained by mixing in a solvent, an aluminum alkoxide or a chelate compound of aluminum, or a mixture thereof, with at least one of
(A) at least one compound of a metal belonging to Group VIB of the Periodic Table, and
(B) at least one compound of a metal belonging to Group VIII of the Periodic Table.

26 Claims, 1 Drawing Sheet

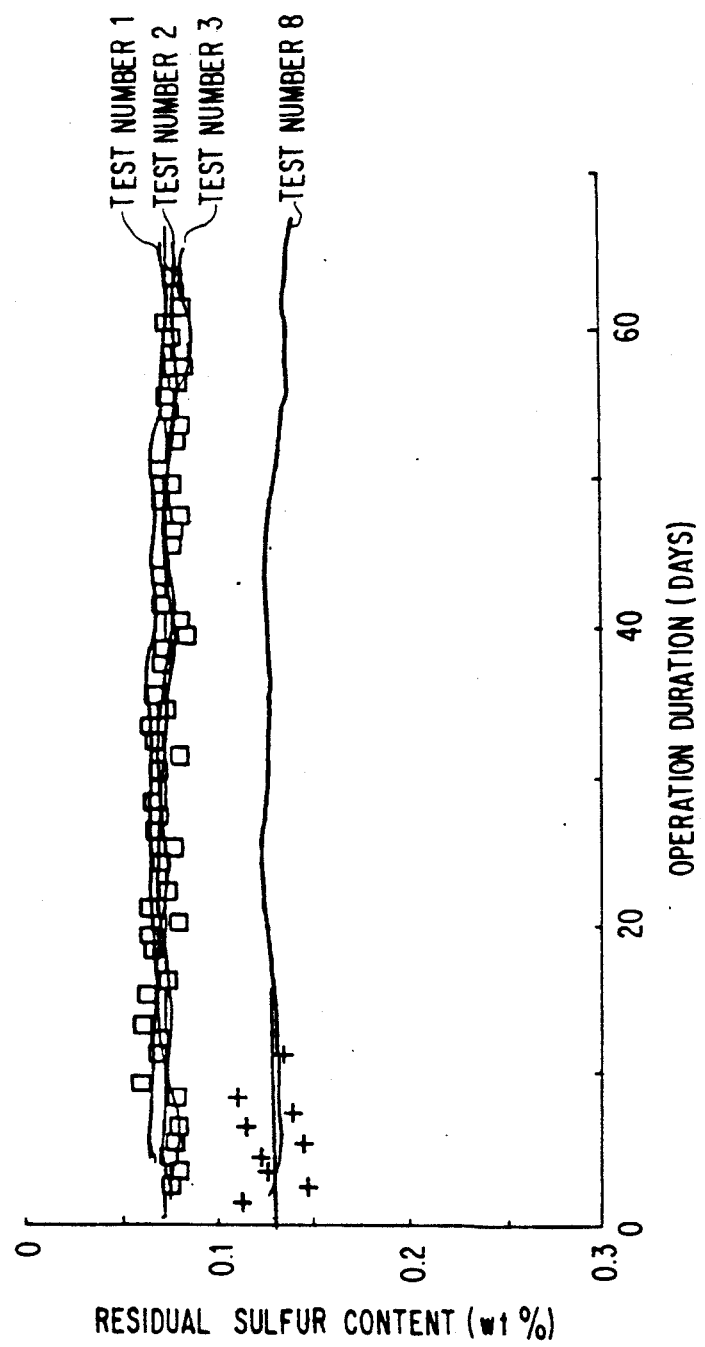

CATALYST COMPOSITION FOR HYDRODESULFURIZATION OF HYDROCARBON OIL AND PROCESS FOR PRODUCING THE SAME

FIELD OF THE INVENTION

The present invention relates to a novel hydrodesulfurization catalyst composition particularly improved in desulfurizing activity and to a process for producing the same.

BACKGROUND OF THE INVENTION

Hydrocarbon oil generally contains sulfur compounds. When the hydrocarbon oil is used as a fuel, sulfur incorporated therein in the sulfur compounds is converted into sulfur oxides and is discharged into the atmosphere. Accordingly, it is preferred that such hydrocarbon oil have as low as possible a sulfur content from the viewpoint of avoiding air pollution upon combustion. This can be achieved by subjecting the hydrocarbon oil to a catalytic hydrodesulfurization process (HDP).

Since environmental pollution problems such as acid rain and nitrogen oxides ($NO_x$) are of great concern world-wide, the removal of sulfur components from oil at the present technological level seems still insufficient. It is, in fact, possible to further reduce the sulfur content of hydrocarbon oil to some extent by operating the aforementioned HDP under more severe conditions, for example, by controlling the LHSV, temperature and pressure. HDP under such severe conditions, however, produces carbonaceous deposits on the surface of the catalyst, which, in turn, cause an abrupt drop in catalyst activity. The matter is even worse with a hydrocarbon oil which contains a light fraction, since HDP operated under severe conditions has a harmful influence, for example, on the color hue stability and storage stability of the oil. It can be seen that operational improvement is only effective to a certain extent, and more drastic measures are needed to develop a catalyst which is considerably increased in catalyst activity.

Hydrodesulfurization catalysts were conventionally produced by methods such as the so-called "impregnation process", which comprises impregnating a carrier with an aqueous solution having dissolved therein a salt of a metal belonging to Group VIII of the Periodic Table (sometimes referred to simply as "Group VIII metal", hereinafter, and the same for one belonging to the Group VIB of the Periodic Table) and a salt of a Group VIB metal, and, after drying, calcining the metal-impregnated carrier; the "coprecipitation process" which comprises adding an aqueous solution of a salt of a Group VIB metal and an aqueous solution of a salt of a Group VIII metal into an aqueous solution having dispersed therein alumina or a gel thereof to effect coprecipitation of a metal compound; and the "kneading process" which comprises kneading under heating a paste mixture composed of alumina or a gel thereof, an aqueous solution containing a salt of a Group VIB metal, and an aqueous solution containing a salt of a Group VIII metal, to remove water therefrom. For reference, see Ozaki, ed., *Shokubai Chousei Kagaku* (Catalyst Preparation Chemistry), pp. 250 to 252, published by Kodansha Scientific.

None of the aforementioned methods, however, are suitable for uniformly dispersing a relatively large amount of metal compounds on the carrier. While it is possible to incorporate an excessive amount of the catalytically active metals in the carrier, there then arises another problem concerning the specific surface area of the catalyst. That is, increasing the amount of the catalytically active metals in the carrier reversely reduces the specific surface area of the catalyst which, as a result, inevitably sets a limit on the improvement in the desulfurizing activity of the catalyst. More specifically, despite the fact that it has been reported that a carrier may carry a relatively large amount of an active metal, the practical content was confined to the range of from about 5 to about 8% by weight in the case of CoO, and from about 19 to about 20% by weight for $MoO_3$.

With respect to a desulfurization process using a conventional catalyst, for example, catalytic hydrodesulfurization of a gas oil containing 1.3% by weight of sulfur carried out at a liquid hourly space velocity of 4 $hr^{-1}$, at a reaction temperature of 350° C., and under a reaction pressure of 35 $kg/cm^2$, this process yields an oil where the sulfur content has been reduced to the range of from about 0.13 to about 0.19% by weight at best. In an another example, i.e., in the case of a vacuum gas oil (VGO) initially containing 2.50% by weight of sulfur, catalytic hydrodesulfurization at a liquid hourly space velocity of 0.4 $hr^{-1}$, at a reaction temperature of 350° C., and under a reaction pressure of 52 $kg/cm^2$, yields a VGO oil the sulfur content of which is reduced only to an insufficient degree, with a limit being in the range of from about 0.15 to about 0.18% by weight. As a further example, a topped crude obtained from a crude oil with a 3.8% by weight sulfur content turns into a product where the sulfur content is lowered but the same is limited to the range of from about 0.9 to about 1.0% by weight, after catalytic hydrodesulfurization at a liquid hourly space velocity of 1.0 $hr^{-1}$, at a reaction temperature of 361° C., and under a reaction pressure of 150 $kg/cm^2$.

It is desired to more readily obtain, without operating the HDP under severe operating condition, a gas oil the sulfur content of which is reduced to the range of from about 0.05 to about 0.08% by weight, and, similarly, a VGO and a topped crude which are reduced in sulfur content in the range of from about 0.08 to about 0.10% and from about 0.6 to about 0.8%, respectively. If this would be possible, not only would the process become highly advantageous in economy from the viewpoint of prolonging the life of the catalyst, but also the resulting oil products would be effective in avoiding air pollution.

An object of the present invention is to develop a catalyst capable of containing a large amount of active metals yet which maintains a relatively high surface area, and which exhibits an extremely high desulfurization activity under ordinary operating conditions such that processing under severe conditions can be avoided.

Another object of the present invention is to provide a fuel oil from which the discharge of sulfur compounds at the time of combustion of the fuel oil is reduced to a level as low as possible, to thereby avoid air pollution.

SUMMARY OF THE INVENTION

The present inventors, after conducting extensive studies to overcome the aforementioned problems, have successfully developed a composite catalyst comprising metal oxides of aluminum, a Group VIII metal, and a Group VIB metal, which is different in structure from conventional catalysts and which, accordingly, can carry the metals of Group VIII and Group VIB at considerably larger quantities as compared with conventional hydrodesulfurization catalysts. Since the catalyst according to the present invention is a composite of metal oxides completely different in structure as compared with those of conventional catalysts, it contains metals at a high content and yet it has a relatively high surface area (about 100 to about 400 m²/ g). Thus, the technology according to the present invention enables desulfurization of a hydrocarbon oil to a high degree, and, further advantageously, provides a catalyst with a longer life than conventional HDP catalysts.

That is, in summary, the first embodiment of the present invention provides a catalyst composition for the hydrodesulfurization of hydrocarbon oil, comprising a composite of metal oxides comprising: aluminum; and at least one metal selected from a group consisting of (A) at least one of the metals belonging to Group VIB of the Periodic Table; and
(B) at least one of the metals belonging to Group VIII of the Periodic Table;

where the metal(s) belonging to Group VIB of the Periodic Table accounts for, in terms of oxide(s), from 10 to 60% by weight with respect to the total catalyst, the metal(s) belonging to the Group VIII of the Periodic Table accounts for, in terms of as oxide(s), from 3 to 20% by weight with respect to the total catalyst, and, aluminum accounts for, in terms of oxide(s), from 87 to 20% by weight with respect to the total catalyst.

The catalyst composition of the first embodiment can be produced by a process which comprises drying and calcining an effective component obtained by mixing in a solvent (c) an aluminum alkoxide, a chelate compound of aluminum or a mixture thereof, with at least one of (a) at least one compound of a metal belonging to Group VIB of the Periodic Table, and (b) at least one compound of a metal belonging to Group VIII of the Periodic Table.

The process for producing the catalyst composition is explained hereinafter as the second embodiment and the third embodiment of the invention.

The second embodiment of the present invention provides a process for producing a catalyst composition for hydrodesulfurization of a hydrocarbon oil comprising a composite of a metal oxide comprising aluminum, a metal belonging to Group VIB of the Periodic Table, and a metal belonging to Group VIII of the Periodic Table, which comprises:

drying and thereafter calcining an effective component (a precipitate) obtained by mixing in a solvent, (a) at least one compound of a Group VIB metal, (b) at least one compound of a Group VIII metal, and (c) an aluminum alkoxide or a chelate compound of aluminum, or a mixture thereof.

The third embodiment of the present invention provides a process for producing a hydrodesulfurization catalyst composition for a hydrocarbon oil comprising a composite composed of a metal oxide comprising aluminum, a metal belonging to Group VIB of the Periodic Table, and a metal belonging to Group VIII of the Periodic Table, which comprises:

mixing first in a solvent (c) an aluminum alkoxide or a chelate compound of aluminum or a mixture thereof with either (a) at least one compound of a Group VIB metal or (b) at least one compound of a Group VIII metal; drying and calcining the effective component (the precipitate) resulting therefrom; and adding the remaining one component, (a) or (b), to the calcined effective component, so that the last component (a) or (b) may be carried on the calcined effective component.

BRIEF EXPLANATION OF THE DRAWING

The FIGURE shows the change with operation duration in the residual sulfur content of an oil subjected to a hydrodesulfurization test, using catalysts according to the present invention A, B, and C (Test Nos. 1, 2, and 3 ,respectively.) and a comparative catalyst T (Test No. 8).

DETAILED DESCRIPTION OF THE INVENTION

The process for producing the hydrodesulfurization catalyst according to the second embodiment of the present invention for use in desulfurizing, hydrocarbon oil is now explained.

Second Embodiment of the Invention

The hydrodesulfurization catalyst according to the first embodiment for use in desulfurizing hydrocarbon oil can be produced by a process which comprises drying and thereafter calcining an effective component (a precipitate) obtained by mixing in a solvent, (a) at least a compound of a Group VIB metal, (b) at least a compound of a Group VIII metal, and (c) an aluminum alkoxide or a chelate compound of aluminum, or a mixture thereof, and the resulting catalyst composition comprises a composite of metal oxides comprising at least one of the metals belonging to Group VIB of the Periodic Table, at least one of the metals belonging to Group VIII of the Periodic Table, and aluminum. The mixing step of the aforementioned components (a), (b), and (c) preferably is carried out by mixing two or three types of starting solutions each containing one or two of the components, in a manner described below as methods "A" to "D". The compounds (a) or (b) may be of any type so long as they are soluble in the solvent (water or an organic solvent) used in the preparation of the starting solutions. The term soluble means a state where a homogenus solution is formed under normal temperature and normal pressure. The component (c), an aluminum alkoxide, a chelate compound of aluminum or a mixture thereof, is soluble in an organic solvent. But this component (c) is insoluble in water or in a mixed solution thereof with an organic solvent (more specifically, a mixed solution containing an organic solvent and water at an organic solvent/water ratio of more than 0/1 to about 10/1). The term insoluble means a state which is insoluble under normal temperature and normal pressure.

The catalyst according to the present invention may be prepared by processes as follows:

Process A

A mixture of components (c) and (b) above, and an organic solvent capable of dissolving those components, are mixed and stirred at about 20° to about 300° C. for about 10 minutes to about 1 hour to thereby obtain a homogeneous solution. To the resulting solution there is then added an aqueous solution of the component (a) above, and the effective component (the precipitate) resulting from this mixture is dried, and calcined.

Process B

A mixture of components (c) and (a) above, and an organic solvent capable of dissolving those components are mixed and stirred at about 20° to about 300° C. for about 10 minutes to about 1 hour to thereby obtain a homogeneous solution. To the resulting solution there is then added an aqueous solution of the component (b) above, and the effective component (the precipitate) resulting from this mixture is dried, and calcined.

Process C

Component (c) and an organic solvent capable of dissolving component (c) are mixed and stirred at about 20° to about 300° C. for about 20 minutes to about 1 hour to thereby obtain a homogeous solution.

To the resulting solution there is then added a mixture of aqueous solutions each containing components (a) and (b), and the effective component (the precipitate) resulting from this mixture is dried, and calcined.

Process D

A mixture of components (c), (b), and (a) above, and an organic solvent capable of dissolving those components are mixed and stirred at about 20° to 300° C. for about 10 minutes to about 1 hour to thereby obtain a homogeneous solution. To the resulting solution there is then added water, and the effective component (the precipitate) resulting from this mixture is dried, and calcined. Water may be used at an appropriate amount sufficient to hydrolyze component (c).

An aluminum alkoxide or a chelate compound of aluminum is used as the essential component in the processes according to the present invention, and it may partly be substituted by at least one of the alkoxides and chelate compounds of silicon, titanium, zirconium, boron, gallium, magnesium, and hafnium. The chelate compounds have 7 to 20 carbon atoms. The alkoxide compounds include, for example, Ti iso-propoxide, Zr iso-propoxide, etc. The amount of substitution may be arbitrarily selected, but a preferred amount is, in terms of oxides, from 5 to 10 parts by weight (hereinafter the same, unless otherwise indicated) of at least one of the alkoxides and chelate compounds of silicon, titanium, zirconium, boron, gallium, magnesium, and hafnium, with respect to the whole amount of alkoxide(s) or chelate compound(s) present, wherein the aluminum alkoxide or the chelate compound of aluminum accounts for from 90 to 95 parts with respect to the whole amount.

Any alkoxide may be used for the aluminum alkoxide of the present invention, but preferred from the view of ease of drying are those having from 1 to 5 carbon atoms in the alkoxyl group thereof, and specifically there can be mentioned aluminum methoxide, aluminum ethoxide, aluminum isopropoxide, aluminum n-butoxide, and aluminum sec-butoxide. The aluminum alkoxide for use in the present invention may be such commercially available, or may be such prepared by the Ziegler process.

As a substitute for the aluminum alkoxide, there may be used chelate compounds of aluminum, either singly or as a mixture thereof with aluminum alkoxides. The chelate compounds of aluminum for use in the present invention include those commercially available, such as aluminum ethylacetoacetatediisopropylate, aluminum acetoacetatedibutoxide, aluminum tris-(acetylacetonate), and aluminum bis-(ethyl-acetoacetate)mono(acetyl-acetonate).

The metal belonging to Group VIB of the Periodic Table for use in the present invention includes chromium, molybdenum, and tungsten, and preferred among them are molybdenum and tungsten.

The metal belonging to Group VIII of the Periodic Table for use in the present invention includes iron, cobalt, nickel, ruthenium, rhodium, palladium, osmium, iridium, and platinum, but preferred among them are cobalt and nickel which belong to the iron group.

The Group VIB metal compound and the Group VIII metal compound should be soluble in the organic solvent or in the water used, and useful in the present invention are, for example, nitrates, chlorides, sulfates, acetates, acetylacetonates, and ammonium salts of the metal acids thereof. The ammonium salts include, for example, ammonium molybdate, ammonium tungstate, etc.

The organic solvent for use in dissolving the (c) component and the Group VIB metal and/or Group VIII metal is essential for preparing a homogeneous solution of the components above or for smoothly carrying out the subsequent gelation step or the like. As such organic solvents, there may be used alcohols, ethers, ketones, and aromatic group compounds. Specifically preferred among them are acetone, methanol, ethanol, n-propanol, iso-propanol, n-butanol, iso-butanol, hexanol, benzene, toluene, xylene, diethyl ether, tetrahydrofuran, and dioxane, which may be used either singly or as a mixture thereof.

The mixed solution, i.e., the solution which contains more than one component, for use in Processes A to D described above comprises as components (c) an aluminum alkoxide or a chelate compound of aluminum, (a) a Group VIB metal, or (b) a Group VIII metal, and an organic solvent capable of dissolving the components (a) to (c), in an amount (in terms of oxides and given by weight, unless otherwise indicated) as described below according to each of the processes A and B:

In Process A, the mixed solution comprises from about 50 to about 98% of the component (c) and from about 50 to about 2% of the component (b), but preferred is the mixed solution which comprises from about 60 to about 80% of component (c) and from about 40 to about 20% of component (b).

In Process B, the mixed solution comprises from about 32 to about 96% of the component (c) and from about 68 to about 4% of the component (a), but preferred is the solution which comprises from about 40 to about 80% of component (c) and from about 60 to about 20% of component (b). In Process C, the component (c) is about 20 to about 87 wt% in terms of dry basis. In Process D, the mixing ratio of the components (a), (b), and (c) is (a) about 10 to about 60 wt%, (b) about 3 to 20wt%, and (c) about 87 to about 20 wt% in terms of dry basis.

The organic solvent in those processes may be used at an appropriate amount sufficient to dissolve the component (c) and the component (a) or (b). There is no particular restriction concerning the method for mixing the aforementioned components, and those commonly used are practiced. Mixing is conducted until a homogeneous solution is obtained. In general, the mixing is carried out at from about 20° to about 300° C., more preferably, at from about 50° to about 200° C., for a duration of from about ten-and-several minutes to about 1 hour to obtain a homogeneous solution as desired.

In the Processes A to D according to the present invention, to the solution which contains more than one component (simply referred to as "organic solvent mixture", hereinafter) comprising an organic solvent having dissolved therein the component (c) is added an aqueous solution (simply referred to as "aqueous solution", hereinafter) containing a compound of the remaining component, or water to thereby obtain a mixed slurry comprising components (a), (b), (c), and a solvent. In Process D according to the present invention, to the organic solvent mixture having dissolved therein the components (a), (b), and (c) is added water, to thereby obtain a mixed slurry. In both of Processes A, B, and D, preferred as the organic solvent solution of the compound of the Group VIB metal is that obtained by dissolving, for example, molybdenum oxide acetylacetonate, and as the organic solvent solution of the compound of the Group VIII metal is that obtained by dissolving, for example, cobalt acetylacetonate.

Preferred as the aqueous solution of the Group VIB metal compound are those obtained by dissolving, for example, ammonium paramolybdate, ammonium bichromate, or ammonium para-tungstate into ion-exchanged water.

Preferred as the aqueous solution of the Group VIII metal compound are those obtained by dissolving, for example, cobalt nitrate hexahydrate, cobalt chloride hexahydrate, nickel nitrate hexahydrate, or nickel chloride hexahydrate in ion-exchanged water.

The aqueous solution or water in each of the Processes A to D preferably is gradually mixed with the organic solvent mixture, and more preferably, is mixed by dropping. If the mixing is instantaneous, the reaction will be insufficiently effected such that the catalyst resulting therefrom would be an unfavorable one, in which the metal oxides are non-uniformly distributed. The mixing is conducted in the temperature range of from about 20° to about 300° C., and preferably, in the range of from about 50° to about 200° C. for about 10 minutes to several days. In Processes A to D, the amount of the component (a) is, as expressed by the amount of the Group VIB metal compound(s) in terms of oxide(s), about 1.0 to 7.0 times, and preferably about 2.0 to 4.0 times the amount of the Group VIII metal. The concentration of the aqueous solution may be used at an appropriate amount sufficient to dissolve the Group VIB metal compounds or the Group VIII metal compounds.

It is preferred that an acid be added to the aqueous solution or water at its preparation, or at the mixing of the aqueous solution with the organic solvent mixture. As useful acids, there can be mentioned phosphoric acid, nitric acid, and hydrochloric acid, with phosphoric acid being the most preferred among them. By thus adding an acid, the dissolution of the metal compounds into the aqueous solution may be accelerated, or the strength of the final catalyst composition may further be increased. A trace amount thereof is sufficient for such purposes, but it is preferred that the acid be added in an amount of from about 0.5 to about 5% by weight with respect to the alumina derived from component (c) (in terms of oxide). Acid added in excess decreases activity, and makes the effect on improving strength less noticeable.

For any of Processed A to D, drying and calcining is typically at the following conditions.

The effective component (the precipitate) is obtained by mixing the organic solvent mixture and the aqueous solution(s) or water set forth above, and a slurry results as the stirring is continued. The effective component (the precipitate) may be extracted with any of the known methods, such as a method for obtaining a dry gel, which comprises removing the solvent using a rotary evaporator under reduced pressure and in the temperature range of from about 50° to about 200° C.; and a method of simply filtering the mixture with a paper filter to separate the effective component.

The dry gel which, if necessary, is calcined in the temperature range of from about 200° to about 800° C. for a duration of from about 1 to about 24 hours in air, and further activated by a sulfurization treatment, if desired or necessary, in the temperature range of from about 150° to about 700° C. The sulfurization treatment includes, for example, gas sulfurization by $H_2S$, liquid sulfurization by LGO, etc., and hydrogen. More specifically, the sulfurization is conducted by 5%$H_2S$ and 95%$H_2$ at about 150° to about 700° C. for 2 hours under normal pressure. The dry gel obtained above, which may undergo a calcining and/or an activation treatment as described above, is then subjected to reaction.

Third Embodiment of the Invention

The hydrodesulfurization catalyst for hydrocarbon oil according to the first embodiment of the present invention may be produced by a process according to the third embodiment of the present invention. The process according to the third embodiment of the present invention comprises:

first drying and calcining an effective component (a precipitate) obtained by mixing (c) an aluminum alkoxide or a chelate compound of aluminum with an organic solvent capable of dissolving the component (c), and (a) at least one compound of a Group VIB metal; and then adding to the calcined effective component, (b) at least a compound of a Group VIII metal, whereafter the resulting product is again subjected to drying and calcining to obtain a calcined effective component carrying thereon the component (b); the process according to the third embodiment of the invention further comprising the same process as above, where the component (b) above is replaced by component (a), and vice versa, i.e., a component (c)/component (b) combination is dried and calcined and then component (a) is added and then drying and calcining again conducted.

The first step of the process according to the third embodiment of the present invention comprises first drying and calcining an effective component obtained by mixing (c) an aluminum alkoxide or a chelate compound of aluminum with an organic solvent capable of dissolving the component (c), and (a) at least a compound of a Group VIB metal, or (b) at least a compound of a Group VIII metal.

The first step above can be carried out by any of the processes E to H now described:

Process E

A homogeneous solution comprising component (c) and an organic solvent capable of dissolving component (c) is obtained by mixing and stirring at about 20° to about 300° C. for about 10 minutes to about 1 hour. To the resulting homogeneous solution is then added an aqueous solution of component (a), and the effective component (the precipitate) resulting from the mixing is dried, and calcined.

Process F

A homogeneous solution comprising component (c) and an organic solvent capable of dissolving component (c) is obtained by mixing and stirring at about 20° to about 300° C. for about 10 minutes to about 1 hour. To the resulting homogeneous solution is then added an aqueous solution of component (b), and the effective component (the precipitate) resulting from the mixing is dried, and calcined.

Process G

A mixture of components (c) and (a) is mixed with an organic solvent capable of dissolving those components, which is further mixed and stirred at about 20° to about 300° C. for about 10 minutes to about 1 hour to thereby obtain a homogeneous solution. To the resulting solution is then added water, and the effective component (the precipitate) resulting from this mixture is dried, and calcined.

Process H

A mixture of components (c) and (b) is mixed with an organic solvent capable of dissolving those components, which is further mixed and stirred at about 20° to about 300° C. for about 10 minutes to about 1 hour to thereby obtain a homogeneous solution. To the resulting solution is then added water, and the effective component resulting from this mixture is dried, and calcined.

The components (a), (b), and (c), as well as the organic solvent above may be the same as those used in the process according to the second embodiment of the present invention.

In the Processes E to H as earlier set forth, the organic solvent is used in an appropriate amount sufficient to dissolve the component (c), the components (c) and (a), or the components (c) and (b), and specifically, for example, is used in an amount from about 0.5 to about 50 parts by weight, and preferably, from about 1.0 to about 30 parts by weight, with respect to 1 part by weight of the component (c).

Component (c), (a) or (b) and the organic solvent are mixed in an ordinary manner, provided that a homogenous solution results from the stirring. In general, the mixing is carried out at from about 20° to about 300° C., more preferably, at from about 50° to about 200° C., for a duration of from about ten-and-several minutes to about 1 hour to obtain a homogeneous solution, as desired.

In Processes G and H, the mixing ratio of the component (a) and (b) is (a) about 3 to about 20 wt%, preferably about 5 to 18 wt%, and (b) about 10 to about 60 wt%, preferably about 20 to 50 wt% (in terms of oxide(s), catalyst basis, and dry basis).

In Processes E to H according to the present invention, to the solution mixture thus prepared (simply referred to as an "organic solvent mixture" hereinafter) comprising an organic solvent having dissolved therein component (c), there is further added at least one compound of a Group VIB metal, at least one compound of a Group VIII metal, preferably an aqueous solution (referred to as an "aqueous solution" hereinafter) containing at least a compound of a Group VIII metal or at least one compound of a Group VIB metal, or water. As the aqueous solutions containing at least one compound of Group VIB metal and at least one compound of Group VIII metal, those used in the process according to the second embodiment of the present invention can be used as well.

The aqueous solution or water in each of the Processes E to H preferably is gradually mixed with the organic solvent mixture, and more preferably, is dropped for several ten minutes to several days at about 20° to about 300° C., preferably about 50° to about 200° C. If the mixing is instantaneous, the reaction would be insufficiently effected so that the catalyst resulting therefrom would be an unfavorable one in which the metal oxides are non-uniformly distributed.

The mixing is conducted in the temperature range of from about 20° to about 300° C., and preferably, in the range of from about 50° to about 200° C.

In the Processes E and F, the amount of the aqueous solution added to the organic solvent is, as expressed in terms of oxides with respect to the total catalyst, from about 10 to about 60%, and preferably, from about 20 to about 50% by weight in the case of a Group VIB metal, and from about 3 to about 20%, preferably from about 5 to about 18% by weight in the case of a Group VIII metal. The concentration of the aqueous solution may be used at an appropriate amount sufficient to dissolve the Group VIB metal compounds or the Group VIII metal compounds.

It is preferred that an acid be added to the aqueous solution at its preparation or at the mixing of the aqueous solution with the organic solvent mixture. As the acids for use therein, there can be mentioned phosphoric acid, nitric acid and hydrochloric acid, with phosphoric acid being the most preferred among them. The effect of the addition and the amount of the addition of the acid are the same as those described in the second embodiment of the present invention.

The effective component is obtained by mixing the organic solvent mixture and the aqueous solution or water set forth above, and a slurry results as the stirring is continued. Next is a drying step. The effective component may be extracted with any of the known methods, such as a method for obtaining a dry gel, which comprises removing the solvent using a rotary evaporator under reduced pressure and at a temperature in the range of from about 50° to about 200° C.; and a method of simply filtering the mixture with a paper filter to separate the effective component The dry gel which is dried in air during about 1 hour to about 1 week at ambient temperature, then it may be calcined in the temperature rang of from about 200° to about 800° C. for a duration of from about 1 to about 24 hours in air.

The second step according to the third embodiment of the present invention comprises incorporating in the product obtained in the first step, an active metal component which belongs to the Group other than that of the metal initially incorporated together with the component (c) in the effective component; specifically, if a Group VIB metal is incorporated in the effective component in step 1, the metal to be carried on the effective component in step 2 is a Group VIII metal, and if a Group VIII metal is already incorporated in the effective component in step 1, a Group VIB metal is to be carried on the effective component in step 2. In step 2, however, a metal belonging to the same Group as that of the metal incorporated in step 1 may also be added, so long as it is accompanied by a metal not belonging to the same Group, i.e., accompanied by the Group VIB or Group VIII metal which has not yet been added.

The active metal components may be carried on the resulting product from the first step in any manner as desired. An impregnating method, for example, may be conducted by spray impregnation which comprises spraying onto the product obtained in step 1, a solution having dissolved therein the active metal component; by immersing the product of step 1 into a relatively large amount of the solution to be impregnated thereinto; or by multistep impregnation, which comprises repeatedly bringing the product of step 1 into contact with the solution to be impregnated thereinto.

As the Group VIB metal for use in the second step, at least one from chromium, molybdenum, and tungsten is used. Preferred among them are molybdenum and tungsten, which may be used either singly or as a combination thereof.

As the Group VIII metal for use in the second step, at least one from iron, cobalt, nickel, palladium, ruthenium, rhodium, and the like may be used. Preferred among them are cobalt and nickel, which may be used either singly or as a combination thereof.

The amount of the active metals, in terms of oxides with respect to the total catalyst, is from about 10 to about 60% by weight, preferably, from about 20 to about 50% by weight in the case of a Group VIB metal, and from about 3 to about 20% by weight, preferably, from about 5 to about 18% by weight in the case of a Group VIII metal. If the amount thereof is too low, the effect of their addition cannot be fully exhibited; if the amount is too high, on the contrary, the mechanical strength of the catalyst is adversely impaired.

Once the product prepared in step 1 above carrying thereon the active metal components is separated from the impregnating solution, next comes the steps of washing it with water, drying, and calcining.

Drying is carried out in air, and the subsequent calcining is conducted in the temperature range of from about 200° to about 800° C., for a duration of from about 1 to about 24 hours. If necessary, the resulting product may further be activated by a sulfurization treatment in the temperature range of from about 150° to about 700° C., and then used in the HDP reaction. The sulfurization treatment includes, for example, gas sulfurization by $H_2S$, liquid sulfurization by LGO, etc., and hydrogen. More specifically, the sulfurization is conducted by 5% $H_2S$ and 95% $H_2$ about 150° to about 700° C. for 2 hours under normal pressure.

The hydrodesulfurization catalyst according to the present invention for use in treating a hydrocarbon oil can be prepared by any of the processes earlier discussed. The catalyst can carry a considerably higher amount of active metals as compared with conventional catalysts, and yet maintain a high surface area (100 to 400 $m^2/g$) and large pore volume (0.35 to 0.57 cc/g).

The catalyst according to the present invention carries the active metals at an amount of, in terms of oxides by weight with respect to the total catalyst, from about 10 to about 60%, preferably, from about 15 to about 55%, and more preferably, from about 20 to about 50% of at least one Group VIB metal, and from about 3 to about 20%, and preferably, from about 5 to about 18% of at least one Group VIII metal. If the amount is too low, in sufficient effects are to be expected; if the amount is to high, not only will the catalyst strength be reduced, but also the effect of improving strength becomes less noticeable. If the amount of the alumina is too low, dispersion of the active metal becomes insufficient.

The characteristic features of the catalyst according to the present invention are closely associated with the novel catalyst structure which can only be realized by the production process according to the present invention. A typical conventional hydrodesulfurization catalyst comprises a carrier made of an alumina or the like carrying thereon active metals. In such a structure, too high an active metal content adversely reduces the specific surface area thereof. As a consequence,, the active metal carried thereon was inevitably limited to a certain amount. On the contrary, the catalyst according to the present invention is based on a production process which involves the novel idea that there is no concept of a "carrier". The process according to the third embodiment of the present invention does involve the concept of "carrying a part of the active metals" in the second step thereof, but this, in the true sense, does not mean carrying an active metal on a carrier without activity. Presumably, the catalyst according to the present invention may have the structure of an uniform composite comprising oxides of aluminum, a Group VIB metal, and a Group VIII metal at random, or, if not at complete random, it may have the structure mainly comprising alumina coordinated with active metal oxides in a complicated manner to increase activity.

The catalyst according to the present invention comprises pores of about 73 to about 108 Å in mean diameter. The catalyst when molded into a cylinder about 3.2 to about 3.6 mm in length and about 1.4 to about 1.6 mm in diameter yields a compacted bulk density of about 0.76 to about 0.80 g/ml and a dashing strength at the side wall of about 1.1 to about 1.4 kg/mm (which corresponds to about 2.4 to 3.1 lbs/mm), which is not inferior as compared to conventional hydrodesulfurization catalysts.

In the practical use of the catalyst according to the present invention, it may be used in mixture with conventional catalysts or with refractory inorganic oxide carriers well known in the art.

The hydrocarbon oil according to the present invention includes the light fraction obtained by topping or vacuum distillation of crude oil, topping residue, and vacuum residue. It also includes coker gas oil, solvent deasphalted oil, oil extracted from tar sand or oil shale, and product oil from the liquefaction of coal.

On a commercial scale, a desulfurizing apparatus for carrying out a catalytic hydrogenation treatment comprises a proper reactor which is used as a fixed bed, a moving bed, or a fluidized bed for the catalyst particles. To carry out the desulfurization as desired, the object oil charged to the reactor is subjected to high temperature and high pressure conditions under a considerably high partial pressure of hydrogen. In a typical desulfurization, the catalyst is maintained as a fixed bed, and the oil to be treated is allowed to pass over the bed. The catalyst may be charged in a single reactor, or may be distributed in two or more continuous reactors. When the starting oil is a heavy oil, it is strongly preferred that a multistage reactor be used. The catalytic reaction is preferably carried out in a temperature range of about 200° to about 500° C., more preferably in a range of from about 250° to about 400° C.; at a liquid hourly space velocity in a range of about 0.05 to about 5.0 $hr^{-1}$, more preferably, in a range of from 0.1 to 4.0 $hr^{-1}$; under a hydrogen pressure in a range of about 30 to about 200 $kg/cm^2 G$, and more preferably, in a range of from about 40 to about 150 $kg/cm^2 G$.

The catalyst according to the present invention can be prepared by a relatively simple process, and yet, the specific desulfurizing activity thereof as obtained from the rate constant calculated under a constant reaction condition is considerably high as compared with those of conventional catalysts. More specifically, for example, in the case of a light gas oil (containing 1.3% by weight of sulfur), the sulfur content of the product oil subjected to treatment with the catalyst according to the present invention was reduced to a very low level of 0.07% by weight, as compared with that of 0.15% by weight, at best, of a product oil produced via a conventional process. Similarly, VGO (containing 2.5% by weight of sulfur) was reduced in sulfur content to as low 0.08% by weight as compared with the conventional 0.15% by weight; and a heavy oil (containing 3.8% by weight of sulfur) was reduced in sulfur content to 0.7% by weight as compared with the conventional 0.9% by weight. Those were achieved quite easily without subjecting the oil to severe conditions. Thus, it can be seen that the activity of the catalyst is highly stable with the passage of time. Since there is no need to carry out extended operation under severe conditions, the catalyst according to the present invention is of great economical advantage. Furthermore, the use of the catalyst according to the present invention provides fuel oil considerably reduced in sulfur content, which, in turn, avoids air pollution.

The present invention is now illustrated in further detail by referring to the following Examples and Comparative Examples, but it should be understood that the present invention is not to be construed as being limited thereto. In the following, Examples 1 to 12 are related to the catalyst and the process for producing the catalyst according to the first and the second embodiments of the present invention, and Examples 13 to 19 are related to those according to the first and the third embodiments of the present invention. The adjustment of the catalysts were conducted under atmospheric pressure. Unless otherwise indicated, all the percents and parts in the following are by weight.

EXAMPLE 1

A solution comprising 2000 cc of sec-butanol having dissolved therein 180.9 g (0.7344 mol) of aluminum sec-butoxide and 54.972 g (0.1543 mol) of cobalt(II) acetylacetonate was stirred at 80° C. for an hour in an Erlenmeyer flask. Separately, 51.679 g (0.04182 mol) of ammonium para-molybdate was dissolved in 280 g of ion exchanged water by vigorously stirring at about 80° C. for 5 minutes. The resulting aqueous solution was added dropwise to the sec-butanol solution prepared above while stirring, and there was observed the precipitation of a purple-colored gelatin-like product. With further stirring, a slightly purple-colored milky white slurry was obtained. Further, the slurry was stirred for 3 more hours at 80° C. The slurry after separation by filtration was heated to obtain a dry gel, which was molded with an extruder into a bar 1.6 mm (1/16 inch) in diameter. The molding was heat treated in a muffle furnace (air oven) at 500° C. for 4 hours to obtain a metal oxide composite (Catalyst A) of $CoO(15\%)$-$MoO_3(45\%)$-$Al_2O_3(40\%)$.

EXAMPLE 2

A solution comprising 2000 cc of iso-propanol having dissolved therein 180.9 g (0.7344 mol) of aluminum sec-butoxide and 54.972 g (0.1543 mol) of cobalt(II) acetylacetonate was stirred at 80° C. for an hour in an Erlenmeyer flask. Separately, 51.679 g (0.04182 mol) of ammonium para-molybdate was dissolved in 280 g of ion exchanged water by vigorously stirring at about 80° C. The resulting aqueous solution was added dropwise to the iso-propanol solution prepared above while stirring, and there was observed the precipitation of a purple-colored gelatin-like product. With further stirring, a slightly purple-colored milky white slurry was obtained. The slurry was stirred for 3 more hours at 80° C. The slurry was charged in a flask, and was subjected to reduced pressure at 100° C. for 30 minutes using a rotary evaporator to remove the solvent. A dry gel was obtained as a result, which was molded with an extruder into a bar 1.6 mm (1/16 inch) in diameter. The molding was heat treated in a muffle furnace at 500° C. for 3 hours to obtain a metal oxide composite (Catalyst B) of $CoO(15\%)$-$MoO_3(45\%)$-$Al_2O_3(40\%)$.

EXAMPLE 3

A metal oxide composite (Catalyst C) of $CoO(15\%)$-$MoO_3(45\%)$-$AlO_3(40\%)$ was obtained in the same manner as in Example 2 above, except for using 150.0 g (0.7344 mol) of aluminum i-propoxide in place of 180.9 g of aluminum sec-butoxide.

EXAMPLE 4

A metal oxide composite (Catalyst D) of $CoO(15\%)$-$MoO_3(45\%)$-$Al_2O_3(40\%)$ was obtained in the same manner as in Example 2 above, except for using 95.493 g (0.29278 mol) of molybdenum oxide acetylacetonate and 4.547 g (0.04182 mol) of cobalt nitrate hexahydrate, in place of 54.972 g (0.1543 mol) of cobalt(II) acetylacetonate and 51.679 g (0.04182 mol) of ammonium para-molybdate, respectively.

EXAMPLE 5

A metal oxide composite (Catalyst E) of $CoO(15\%)$-$MoO_3(45\%)$-$Al_2O_3(40\%)$ was obtained in the same manner as in Example 2 above, except for using 20.034 g (0.154 mol) of cobalt(I) chloride in place of 54.972 g (0.1543 mol) of cobalt acetylacetonate.

EXAMPLE 6

A metal oxide composite (Catalyst F) of $CoO(15\%)$-$MoO_3(45\%)$-$SiO_2(20\%)$-$Al_2O_3(20\%)$ was obtained in the same manner as in Example 2 above, except for using 90.45 g (0.3672 mol) of aluminum sec-butoxide together with 64.930 g (0.31167 mol) of tetraethoxysilane in place of 180.9 g of aluminum sec-butoxide.

EXAMPLE 7

A metal oxide composite (Catalyst G) of $CoO(15\%)$-$MoO_3(45\%)$-$SiO_2(5\%)$-$Al_2O_3(35\%)$ was obtained in the same manner as in Example 2 above, except for using 158.288 g (0.6426 mol) of aluminum sec-butoxide together with 16.232 g (0.07791 mol) of tetraethoxysilane in place of 180.9 g of aluminum sec-butoxide.

EXAMPLE 8

A solution comprising 2000 cc of iso-propanol having dissolved therein 180.9 g (0.7344 mol) of aluminum sec-butoxide was maintained at 80° C. in an Erlenmeyer flask. Separately, 54.399 g (0.04402 mol) of ammonium para-molybdate and 54.547 g (0.1874 mol) of cobalt nitrate were dissolved in 280 g of ion exchanged water by vigorously stirring at about 80° C. The resulting aqueous solution was added dropwise while stirring, along with 3.202 g of phosphoric acid (85% concentration) to the iso-propanol solution prepared above and there was observed the precipitation of a purple-colored gelatin-like product. With further stirring, a slightly purple-colored milky white slurry was obtained. Subsequent operations were carried out in the same manner as in Example 2 to finally obtain a metal oxide composite (Catalyst H) of $CoO(15\%)$-$MoO_3(45\%)$-$P_2O_5(2\%)$-$Al_2O_3(38\%)$.

EXAMPLE 9

A metal oxide composite (Catalyst I) of $CoO(15\%)$-$MoO_3(45\%)$-$TiO_2(5\%)$-$Al_2O_3(35\%)$ was obtained in the same manner as in Example 7 above, except for using 16.653 g (0.05859 mol) of titanium isopropoxide in place of 16.232 g of tetraethoxysilane.

EXAMPLE 10

A metal oxide composite (Catalyst J) of $CoO(15\%)$-$MoO_3(45\%)$-$ZrO_2(5\%)$-$Al_2O_3(35\%)$ was obtained in the same manner as in Example 7 above, except for using 12.431 g (0.03799 mol) of zirconium n-propoxide in place of 16.232 g of tetraethoxysilane.

EXAMPLE 11

A metal oxide composite (Catalyst K) of $CoO(10\%)$-$MoO_3(40\%)$-$Al_2O_3(50\%)$ was obtained in the same manner as in Example 2 above, except for reducing the amount of cobalt(II) acetylacetonate from 54.972 g to 29.40 g (0.0825 mol), and the amount of ammonium paramolybdate from 51.679 g to 36.70 g (0.0297 mol).

EXAMPLE 12

A metal oxide composite (Catalyst L) of $CoO(10\%)$-$MoO_3(53\%)$-$Al_2O_3(37\%)$ was obtained in the same manner as in Example 2 above, except for reducing the amount of cobalt(II) acetylacetonate from 54.972 g to 39.60 g (0.1120 mol) while increasing the amount of ammonium para-molybdate from 51.679 g to 65.80 g (0.0532 mol), and using 2,000 cc of sec-butanol in place of i-propanol.

EXAMPLE 13

A solution comprising 2000 cc of iso-propanol having dissolved therein 180.9 g (0.7344 mol) of aluminum sec-butoxide was stirred at 80° C. for one hour in an Erlenmeyer flask. Separately, 51.679 g (0.04182 mol) of ammonium para-molybdate was dissolved in 280 g of ion exchanged water by vigorously stirring with heating. The resulting aqueous solution was dropwise added while stirring to the iso-propanol solution prepared above and there was observed the formation of a milky white slurry. The slurry was stirred for 3 more hours at 80° C. The slurry after separation by filtration was heated for condensation to obtain a dry gel, which was molded with an extruder into a bar 1.6 mm (1/16 inch) in diameter. The molding was heat treated in a muffle furnace at 500° C. for 4 hours.

The heat treated molding was immersed in an aqueous solution prepared by dissolving 54.547 g (0.1874 mol) of cobalt nitrate hexahydrate in 60 ml of ion exchanged water, to thereby obtain a molding carrying thereon cobalt. The molding was air dried, and further calcined at 500° C. for 10 hours to obtain a metal oxide composite (Catalyst M) of $CoO(15\%)$-$MoO_3(45\%)$-$Al_2O_3(40\%)$, having a specific surface area of 240 m²/g and a specific pore volume of 0.513 cc/g.

EXAMPLE 14

Preparation of the catalyst

A solution comprising 2000 cc of iso propanol having dissolved therein 180.9 g (0.7344 mol) of aluminum sec-butoxide was stirred at 80° C. for one hour in an Erlenmeyer flask. Separately, 40.2937 g (0.13845 mol) of cobalt nitrate hexahydrate was dissolved in 280 g of ion exchanged water by vigorously stirring with heating at about 80° C. The resulting aqueous solution was dropwise added while stirring to the iso-propanol solution prepared above and the formation of a slightly purple-colored milky white slurry was observed. The slurry was stirred for 3 more hours at 80° C. The slurry after separation by filtration was heated for condensation to obtain a dry gel, which was molded with an extruder into a bar 1/16 inch in diameter. The molding was heat treated in a muffle furnace at 500° C. for 4 hours.

The heat treated molding was immersed into an aqueous solution prepared by dissolving 25.060 g (0.2028 mol) of ammonium para-molybdate in 60 ml of ion exchanged water to thereby obtain a molding carrying thereon molybdenum. The molding was air dried, and further calcined at 500° C. for 10 hours to obtain a metal oxide composite (Catalyst N) of $CoO(15\%)$-$MoO_3(30\%)$-$Al_2O_3(55\%)$, having a specific surface area of 210 m²/g and a specific pore volume of 0.48 cc/g.

EXAMPLE 15

Preparation of the Catalyst

A metal oxide composite (Catalyst O) of $CoO(15\%)$-$MoO_3(45\%)$-$Al_2O_3(40\%)$ having a specific surface area of 225 m²/g and a specific pore volume of 0.50 cc/g was obtained in the same manner as in Example 13 above, except for using 150.0 g (0.7344 mol) of aluminum i-propoxide in place of 180.9 g (0.7344 mol) of aluminum sec-butoxide.

EXAMPLE 16

Preparation of the catalyst

A metal oxide composite (Catalyst P) of $CoO(15\%)$-$MoO_3(45\%)$-$SiO_2(20\%)$-$Al_2O_3(20\%)$ having a specific surface area of 168 m²/g and a specific pore volume of 0.52 cc/g was obtained in the same manner as in Example 13, above, except for using 90.45 g (0.3672 mol) of aluminum sec-butoxide together with 64.930 g (0.31167 mol) of tetraethoxysilane in place of 180.9 g (0.7344 mol) of aluminum sec-butoxide.

EXAMPLE 17

Preparation of the catalyst

A metal oxide composite (Catalyst Q) of $CoO(15\%)$-$MoO_3(45\%)$-$TiO_2(5\%)$-$Al_2O_3(35\%)$ having a specific surface area of 205 m²/g and a specific pore volume of 0.40 cc/g was obtained in the same manner as in Example 13 above, except for using 158.288 g (0.642611 mol) of aluminum sec-butoxide together with 16.653 g (0.058585 mol) of titanium isopropoxide, in place of 180.9 g of (0.7344 mol) of aluminum sec-butoxide.

EXAMPLE 18

Preparation of the catalyst

A metal oxide composite (Catalyst R) of $CoO(15\%)$-$MoO_3(30\%)$-$ZrO_2(5\%)$-$Al_2O_3(50\%)$ having a specific surface area of 200 m²/g and a specific pore volume of 0.39 cc/g was obtained in the same manner as in Example 14 above, except for using 12.431 g (0.03798 mol) of zirconium n-propoxide together with 158.288 g (0.642611 mol) of aluminum sec-butoxide, in place of 180.9 g of (0.7344 mol) of aluminum sec-butoxide.

EXAMPLE 19

Preparation of the catalyst

A metal oxide composite (Catalyst S) of $CoO(15\%)$-$MoO_3(45\%)$-$Al_2O_3(40\%)$ having a specific surface area of 238 $m^2/g$ and a specific pore volume of 0.52 cc/g was obtained in the same manner as in Example 13 above, except for using 90.45 g (0.0372 mol) of aluminum sec-butoxide together with 100.72 g (0.3672 mol) of aluminum ethylacetoacetatediisopropylate, in place of 180.9 g of aluminum sec-butoxide.

COMPARATIVE EXAMPLE 1

In an eggplant-shaped flask there was prepared a solution by dissolving 4.7 g of ammonium molybdate in 14.5 ml of ion exchange-d water, and to the resulting solution was immersed 20 g of an alumina carrier (substantially comprising $\gamma$-$Al_2O_3$) having a specific pore volume of 0.7123 ml/g and a specific surface area of 336 $m^2/g$. After immersion for a duration of 1 hour, the carrier was withdrawn from the solution, air dried, and calcined at 500° C. for 10 hours in a muffle furnace. The carrier was then immersed in an aqueous solution containing 5 g of cobalt nitrate dissolved in 14.5 ml of ion exchanged water to thereby obtain a carrier carrying cobalt. The cobalt-carrying carrier was air dried and calcined at 500° C. for 10 hours to obtain a catalyst of $CoO(5\%)$-$MoO_3(15\%)$-$Al_2O_3(80\%)$ (Catalyst T) having a specific surface area of 266 $m^2/g$ and a specific pore volume of 0.5478 cc/g.

COMPARATIVE EXAMPLE 2

A metal oxide composite (Catalyst U) of $CoO(2\%)$-$MoO_3(5\%)$-$Al_2O_3(93\%)$ was obtained in the same manner as in Example 2 above, except for reducing the amount of cobalt(II) acetylacetonate from 54.972 g (0.1543 mol) to 3.150 g (0.00884 mol) and that of ammonium paramolybdate from 51.679 g (0.04182 mol) to 2.47 g (0.00199 mol).

COMPARATIVE EXAMPLE 3

A metal oxide composite (Catalyst V) of $CoO(25\%)$-$MoO_3(75\%)$ was obtained in the same manner as in Example 2 above, except for increasing the amount of cobalt(II) acetylacetonate from 54.972 g (0.1543 mol) to 109.9 g (0.3748 mol) and that of ammonium p-molybdate from 51.679 g (0.04182 mol) to 103.4 g (0.08367 mol), while not using aluminum sec-butoxide.

COMPARATIVE EXAMPLE 4

A solution comprising 2000 cc of iso-propanol having dissolved therein 180.9 g (0.7344 mol) of aluminum sec-butoxide was stirred at 80° C. for one hour in an Erlenmeyer flask. Separately, 2.47 g (0.001998 mol) of ammonium para-molybdate was dissolved in 280 g of ion exchanged water by vigorously stirring while heating. The resulting aqueous solution was dropwise added while stirring to the iso-propanol solution prepared above and the formation of a milky white slurry was observed. The slurry was stirred for 3 more hours at 80° C. The slurry after separation by filtration was heated for condensation to obtain a dry gel, which was molded with an extruder into a bar 1.6 mm (1/16 inch) in diameter. The molding was heat treated in a muffle furnace at 500° C. for 4 hours.

The heat treated molding was immersed into an aqueous solution prepared by dissolving 3.13 g (0.01076 mol) of cobalt nitrate hexahydrate in 25 ml of ion exchanged water to thereby obtain a molding carrying thereon cobalt. The molding was air dried, and further calcined at 500° C. for 10 hours to obtain a metal oxide composite (Catalyst W) of $CoO(2\%)$-$MoO_3(5\%)$-$Al_2O_3(93\%)$.

COMPARATIVE EXAMPLE 5

An attempt was made to prepare a catalyst carrying 10% of cobalt and 35% molybdenum (in terms of oxides) with respect to the total catalyst by a conventional impregnation method. First, an attempt was made to dissolve ammonium para molybdate in water taken equivolume with the specific pore volume, 0.7123 ml/g (specific surface area: 336 $m^2/g$), but it remained insoluble despite heating or the addition of ammonia. The same operation was repeated for cobalt nitrate, which gave the same result. Accordingly, it can be seen that a catalyst prepared by conventional processes is not capable of carrying a large amount of active metals.

Each of the catalysts A to W prepared in Examples 1 to 19 and Comparative Examples 1 to 4 was used to hydrodesulfurize hydrocarbon oil under the following operating conditions, and each of the catalysts was evaluated according to the methods as follows.

Hydrodesulfurization of Gas Oil

Raw material: LGO (Specific gravity (15/4° C.):0.851; Sulfur con-tent: 1.35%; Nitrogen content: 20 ppm; Viscosity (at 30° C.): 5.499 cSt.)

Reaction conditions: Temperature: 350° C.; Hydrogen Pressure: 35 kg/$cm^2$; Liquid hourly space velocity: 4 $hr^{-1}$; Apparatus: Fixed-bed type high pressure flow reactor; Catalyst: Catalysts A, B, C, E, H, I, J, M, N, O, S, T, U, V, and W.

Evaluation method: Sulfur content of the product oil after operating the reaction under the above conditions for 100 hours or for 60 days was analyzed. The results are given in Tables 2 and 5. Furthermore, the FIG. presents changes in residual sulfur with the passage of time for Catalysts A, B, C, and T.

Hydrodesulfurization of VGO

Raw material: VGO (Specific gravity (15/4° C.): 0.916; Sulfur content: 2.53%; Nitrogen content: 780 ppm; Viscosity (at 30° C.): 28.8 cSt.)

Reaction conditions: Temperature: 350° C.; Hydrogen Pressure: 52 kg/$cm^2$; Liquid hourly space velocity: 0.4 $hr^{-1}$;

Apparatus: Fixed-bed type high pressure flow reactor; Catalyst: Catalysts A, B, C, E, F, H, I, J, P, Q, T, U, V, and W.

Evaluation method: Sulfur content of the product oil after operating the reaction under the above conditions for 100 hours was analyzed. The results are given in Tables 3 and 6.

Hydrodesulfurization of Heavy Oil

Raw material: Topped crude obtained from a crude oil from Kuwait (Specific gravity (15/4° C.): 0.956; Sulfur content: 3.77%; Asphaltene content: 3.9%; Vanadium content: 48 ppm; Nickel content: 14ppm)

Reaction conditions: Temperature: 361° C.; Hydrogen Pressure: 150 kg/$cm^2$; Hydrogen/hydrocarbon oil ratio: 830 Nm³/Kl; Hydrogen concentration: 90 mol%; Liquid hourly space velocity: 1.0 hr⁻¹; Apparatus: Fixed-bed type high pressure flow reactor; Catalyst: Catalysts A, B, C, D, J, K, L, M, R, T, U, and V.

Evaluation method: Sulfur content of the product oil after operating the reaction under the above conditions for 100 hours was analyzed. The results are given in Tables 4 and 7.

While the invention has been described in detail and with reference to specific embodiments thereof, it will be apparent to one skilled in the art that various changes and modifications can be made therein without departing from the spirit and scope thereof.

TABLE 1

|  |  | Starting Material[1] |  |  | Catalyst Composition (wt %) |  | Specific Surface Area (m²/g) | Specific Pore Volume (cc/g) | Catalyst |
|---|---|---|---|---|---|---|---|---|---|
| Ex. 1 | Aluminum sec-butoxide Cobalt acetylacetate | (180.9 g) (55.0) | sec-Butanol (2000 cc) | Ammonium p-molybdate (51.7) | CoO MoO₃ Al₂O₃ | (15) (45) (40) | 237 | 0.5 | A |
| Ex. 2 | Aluminum sec-butoxide Cobalt acetylacetate | (180.9) (55.0) | i-Propanol (2000 cc) | ↑ | CoO MoO₃ Al₂O₃ | (15) (45) (40) | 242 | 0.51 | B |
| Ex. 3 | Aluminum i-propoxide Cobalt acetylacetonate | (150.0) (55.0) | ↑ | ↑ | CoO MoO₃ Al₂O₃ | (15) (45) (40) | 218 | 0.49 | C |
| Ex. 4 | Aluminum sec-butoxide Molybdenumoxide acetylacetonate | (180.9) (95.5) | ↑ | Cobalt nitrate (55.0) | CoO MoO₃ Al₂O₃ | (15) (45) (40) | 133 | 0.36 | D |
| Ex. 5 | Aluminum sec-butoxide Cobalt chloride | (180.9) (20.0) | ↑ | Ammonium p-molybdate (51.7) | CoO MoO₃ Al₂O₃ | (15) (45) (40) | 100 | 0.60 | E |
| Ex. 6 | Aluminum sec-butoxide Tetraethoxysilane Cobalt acetylacetonate | (90.5) (64.9) (55.0) | ↑ | ↑ | CoO MoO₃ SiO₂ Al₂O₃ | (15) (45) (20) (20) | 157 | 0.51 | F |
| Ex. 7 | Aluminum sec-butoxide Tetraethoxysilane Cobalt acetylacetonate | (158.3) (16.2) (55.0) | ↑ | ↑ | CoO MoO₃ SiO₂ Al₂O₃ | (15) (45) (5) (35) | 188 | 0.50 | G |
| Ex. 8 | Aluminum sec-butoxide | (180.9) | ↑ | Ammonium p-molybdate (54.40) Cobalt nitrate (54.55) Prophoric acid (3.20) | CoO MoO₃ P₂O₅ Al₂O₃ | (15) (45) (2) (38) | 225 | 0.48 | H |
| Ex. 9 | Aluminum sec-butoxide Titanium isopropoxide Cobalt acetylacetonate | (158.0) (16.7) (55) | ↑ | Ammonium p-molybdate (51.7) | CoO MoO₃ TiO₂ Al₂O₃ | (15) (45) (5) (35) | 213 | 0.39 | I |
| Ex. 10 | Aluminum sec-butoxide Zirconium n-propoxide Cobalt acetylacetonate | (158.0) (12.4) (55.0) | ↑ | ↑ | CoO MoO₃ ZrO₂ Al₂O₃ | (15) (45) (5) (35) | 205 | 0.42 | J |
| Ex. 11 | Aluminum sec-butoxide Cobalt acetylacetonate | (180.9) (29.4) | ↑ | Ammonium p-molybdate (36.7) | CoO MoO₃ Al₂O₃ | (10) (40) (50) | 245 | 0.42 | K |
| Ex. 12 | Aluminum sec-butoxide Cobalt acetylacetonate | (180.9) (39.6) | sec-Butanol (2000 cc) | Ammonium p-molybdate (65.8) | CoO MoO₃ Al₂O₃ | (10) (53) (37) | 213 | 0.48 | L |
| Comp. Ex. 1 | Conventional preparation by immersion process |  |  |  | CoO MoO₃ Al₂O₃ | (5) (15) (80) | 266 | 0.55 | T |
| Comp. Ex. 2 | Aluminum sec-butoxide Cobalt acetylacetonate | (180.9) (3.15) | i-propanol (2000 cc) | Ammonium p-molybdate (2.47) | CoO MoO₃ Al₂O₃ | (2) (5) (93) | 284 | 0.72 | U |
| Comp. Ex. 3 | Aluminum sec-butoxide Cobalt acetylacetonate | (0) (109.9) | ↑ | Ammonium p-molybdate (103.4) | CoO MoO₃ Al₂O₃ | (25) (75) (0) | 116 | 0.27 | V |

|  |  | Starting Material |  |  | Catalyst Composition (wt %) |  | Specific Surface Area (m²/g) | Specific Pore Volume (cc/g) | Catalyst |
|---|---|---|---|---|---|---|---|---|---|
|  |  | First Step |  | Second Step |  |  |  |  |  |
| Ex. 13 | Aluminum sec-butoxide i-Propanol | (180.9) (2000 cc) | Ammonium p-molybdate (51.679) | Cobalt nitrate (54.547) | CoO MoO₃ Al₂O₃ | (15) (45) (40) | 240 | 0.513 | M |
| Ex. 14 | Aluminum sec-butoxide i-Propanol | (180.9) (2000 cc) | Cobalt nitrate (40.2937) | Ammonium p-molybdate (25.060) | CoO MoO₃ Al₂O₃ | (15) (30) (55) | 210 | 0.48 | N |
| Ex. 15 | Aluminum iso-propoxide i-Propanol | (150.0) (2000 cc) | Ammonium p-molybdate (51.679) | Cobalt nitrate (54.547) | CoO MoO₃ Al₂O₃ | (15) (45) (40) | 225 | 0.50 | O |

TABLE 1-continued

| | | | | | | | | | | |
|---|---|---|---|---|---|---|---|---|---|---|
| Ex. 16 | Aluminum sec-butoxide<br>Tetraethoxy silane<br>i-Propanol | (90.45)<br>(64.97)<br>(2000 cc) | Ammonium p-<br>molybdate<br>(51.679) | Cobalt nitrate<br>(54.547) | CoO<br>$MoO_3$<br>$SiO_2$<br>$Al_2O_3$ | (15)<br>(45)<br>(20)<br>(20) | 168 | 0.52 | P |
| Ex. 17 | Aluminum sec-butoxide<br>Titanium isopropoxide<br>i-Propanol | (158.3)<br>(16.65)<br>(2000 cc) | Ammonium p-<br>molybdate<br>(51.679) | Cobalt nitrate<br>(54.547) | CoO<br>$MoO_3$<br>$TiO_2$<br>$Al_2O_3$ | (15)<br>(45)<br>(5)<br>(35) | 205 | 0.40 | Q |
| Ex. 18 | Aluminum sec-butoxide<br>Zirconium n-propoxide<br>i-Propanol | (158.3)<br>(12.43)<br>(2000 cc) | Cobalt nitrate<br>(40.2937) | Ammonium p-<br>molybdate<br>(25.060) | CoO<br>$MoO_3$<br>$ZrO_2$<br>$Al_2O_3$ | (15)<br>(30)<br>(5)<br>(50) | 200 | 0.39 | R |
| Ex. 19 | Aluminum sec-butoxide<br>Aluminum ethylaceto-<br>diisopropylate<br>i-Propanol | (90.45)<br>(100.7)<br><br>(2000 cc) | Ammonium p-<br>molybdate<br>(51.679) | Cobalt nitrate<br>(54.547) | CoO<br>$MoO_3$<br>$Al_2O_3$ | (15)<br>(45)<br>(40) | 238 | 0.52 | S |
| Comp.<br>Ex. 4 | Aluminum sec-butoxide<br>i-Propanol | (180.9)<br>(2000 cc) | Ammonium p-<br>molybdate<br>(2.47) | Cobalt nitrate<br>(3.13) | CoO<br>$MoO_3$<br>$Al_2O_3$ | (2)<br>(5)<br>(93) | — | — | W |

Note
[1]The amount (given in the parenthesis) of the starting materials are only round figures, and given in grams unless otherwise stated. The following properties are valid for Examples 1 through 19 and for Comparative Examples 1 through 3.
Average pore diameter: 73 to 108 Å; Compacted bulk density: 0.76 to 0.80 g/ml; Length of cylinder: 3.2 to 3.6 mm; Diameter of cylinder: 1.4 to 1.6 mm; and Clashing strength of the side wall: 1.1 to 1.4 kg/mm (2.4 to 3.1 lbs/mm).

TABLE 2

| Test No.[1] | 1 | 2 | 3 | 4 | 5 | 6 | 7 | 8 | 9 | 10 |
|---|---|---|---|---|---|---|---|---|---|---|
| Catalyst | A | B | C | E | H | I | J | T | U | V |
| Sulfur Content (wt %) | 0.07 | 0.07 | 0.08 | 0.09 | 0.09 | 0.09 | 0.09 | 0.13 | 0.28 | 0.22 |
| Desulfurization Rate (%) | 94.8 | 94.8 | 94.1 | 93.3 | 93.3 | 93.3 | 93.3 | 90.4 | 79.2 | 83.7 |

Note
[1]Values for Nos. 1 to 3 and 8 are taken after 60 days of operation, and the rest are taken after an operation duration of 100 hours.

TABLE 3

| Test No.[1] | 11 | 12 | 13 | 14 | 15 | 16 | 17 | 18 | 19 | 20 | 21 |
|---|---|---|---|---|---|---|---|---|---|---|---|
| Catalyst | A | B | C | E | F | H | I | J | T | U | V |
| Sulfur Content (wt %) | 0.08 | 0.08 | 0.09 | 0.11 | 0.10 | 0.10 | 0.10 | 0.10 | 0.15 | 0.18 | 0.27 |
| Desulfurization Rate (%) | 96.8 | 96.8 | 96.4 | 95.7 | 96.0 | 96.0 | 96.0 | 96.0 | 94.1 | 92.9 | 89.3 |

TABLE 4

| Test No.[1] | 22 | 23 | 24 | 25 | 26 | 27 | 28 | 29 | 30 | 31 |
|---|---|---|---|---|---|---|---|---|---|---|
| Catalyst | A | B | C | D | J | K | L | T | U | V |
| Sulfur Content (wt %) | 0.67 | 0.67 | 0.71 | 0.81 | 0.76 | 0.71 | 0.76 | 0.93 | 1.44 | 1.07 |
| Desulfurization Rate (%) | 82.2 | 82.2 | 81.1 | 78.5 | 79.8 | 81.1 | 79.8 | 75.3 | 61.8 | 71.6 |

TABLE 5

| Test No.[1] | 32 | 33 | 34 | 35 | 36 | 37 |
|---|---|---|---|---|---|---|
| Catalyst | M | N | O | S | T | W |
| Sulfur Content (wt %) | 0.08 | 0.09 | 0.08 | 0.07 | 0.13 | 0.27 |

TABLE 6

| Test No.[1] | 38 | 39 | 40 | 41 |
|---|---|---|---|---|
| Catalyst | P | Q | T | W |
| Sulfur Content (wt %) | 0.09 | 0.10 | 0.15 | 0.18 |

TABLE 7

| Test No.[1] | 42 | 43 | 44 |
|---|---|---|---|
| Catalyst | M | R | T |
| Sulfur Content (wt %) | 0.71 | 0.78 | 0.93 |

What is claimed is:

1. A process for producing a catalyst composition for the hydrodesulfurization of a hydrocarbon oil comprising a composite of a metal oxide containing aluminum and at least one metal belonging to Group VIB of the Periodic Table or at least one metal belonging to Group VIII of the Periodic Table, which comprises:
   drying and thereafter calcining an effective component obtained by mixing in essentially an organic solvent (c) an aluminum alkoxide, a chelate compound of aluminum or a mixture thereof, with
   at least one selected from the group consisting of
   (a) at least one compound of a metal belonging to Group VIB of the Periodic Table, and
   (b) at least one compound of a metal belonging to Group VIII of the Periodic Table.

2. A process for producing a catalyst composition for the hydrodesulfurization of a hydrocarbon oil comprising a composite of a metal oxide containing aluminum, at least one metal belonging to Group VIB of the Periodic Table, and at least one metal belonging to Group VIII of the Periodic Table, which comprises:
   drying and thereafter calcining an effective component obtained by mixing in essentially an organic solvent (c) an aluminum alkoxide, a chelate compound of aluminum or a mixture thereof, with
(a) at least one compound of a metal belonging to Group VIB of the Periodic Table, and
(b) at least one compound of a metal belonging to Group VIII of the Periodic Table.

3. A process for producing a catalyst composition for the hydrodesulfurization of a hydrocarbon oil comprising a composite of a metal oxide containing aluminum, at least one metal belonging to Group VIB of the Periodic Table, and at least one metal belonging to Group VIII of the Periodic Table, which comprises:
a) mixing (a) at least one compound of a metal belonging to Group VIB of the Periodic Table with a solution of (c) an aluminum alkoxide or a chelate compound of aluminum and essentially an organic solvent capable of dissolving them;
b) drying and calcining an effective component resulting from step a); and
c) adding to the product obtained in step b), (b) at least one compound of a metal belonging to Group VIII of the Periodic Table, followed by drying and calcining the resulting product.

4. A process for producing a catalyst composition for the hydrodesulfurization of a hydrocarbon oil comprising a composite of a metal oxide containing aluminum, at least one metal belonging to Group VIB of the Periodic Table, and at least one metal belonging to the Group VIII of the Periodic Table, which comprises:
a) mixing (b) at least one compound of a metal belonging to Group VIII of the Periodic Table with a solution mixture of (c) an aluminum alkoxide or a chelate compound of aluminum and essentially an organic solvent capable of dissolving them,
b) drying and calcining an effective component resulting from step a); and
c) adding to the product in step (b), (a) at least one compound of a metal belonging to Group VIB of the Periodic Table, followed by drying and calcining the resulting product.

5. A catalyst composition for the hydrodesulfurization of a hydrocarbon oil produced by the process of claim 1, comprising a composite of metal oxides comprising aluminum; and
at least one metal selected from a group consisting of
(A) at least one metal belonging to Group VIB of the Periodic Table; and
(B) at least one metal belonging to Group VIII of the Periodic Table;
wherein the at least one metal belonging to Group VIB of the Periodic Table accounts for, in terms of oxide, from 10 to 60% by weight with respect to the total catalyst, and wherein the at least one metal belonging to Group VIII of the Periodic Table accounts for, in terms of oxide, from 3 to 20% by weight with respect to the total catalyst.

6. The catalyst composition for the hydrodesulfurization of a hydrocarbon oil as claimed in claim 5, wherein the at least one metal belonging to Group VIB of the Periodic Table accounts for, in terms of oxide, from 15 to 55% by weight with respect to the total catalyst.

7. The catalyst composition for the hydrodesulfurization of a hydrocarbon oil as claimed in claim 5, wherein the at least one metal belonging to the Group VIII of the Periodic Table accounts for, in terms of oxide, from 5 to 185 by weight with respect to the total catalyst.

8. The catalyst composition for the hydrodesulfurization of a hydrocarbon oil as claimed in claim 5, wherein the hydrocarbon oil is a light fraction obtained by topping or vacuum distillation of crude oil, a topping residue, a vacuum residue, a coker gas oil, a solvent deasphalted oil, an oil extracted from tar sand or oil shale, and a product oil from the liquefaction of coal.

9. The process for producing a catalyst composition for the hydrodesulfurization of a hydrocarbon oil as claimed in claim 1 or 2, wherein the process further comprises:
a) mixing and stirring for a predetermined duration, a mixture of (c) an aluminum alkoxide or a chelate compound of aluminum, (b) at least one compound of a metal belonging to Group VIII of the Periodic Table, and essentially an organic solvent capable of dissolving those components, to thereby obtain a homogeneous solution;
b) adding an aqueous solution containing (a) at least one compound of a metal belonging to Group VIB of the Periodic Table to the resulting solution; and
c) drying and calcining an effective component resulting from step b).

10. The process for producing a catalyst composition for the hydrodesulfurization of a hydrocarbon oil as claimed in claim 1 or 2, wherein the process further comprises:
a) mixing and stirring a mixture of (c) an aluminum alkoxide or a chelate compound of aluminum, (a) at least one compound of a metal belonging to Group VIB of the Periodic Table, and essentially an organic solvent capable of dissolving those components, to thereby obtain a homogeneous solution;
b) adding an aqueous solution containing (b) at least one compound of a metal belonging to Group VIII of the Periodic Table to the resulting solution; and
c) drying and calcining an effective component resulting from step b).

11. The process for producing a catalyst composition for the hydrodesulfurization of a hydrocarbon oil as claimed in claim 1 or 2, wherein the process further comprises:
a) dissolving (c) an aluminum alkoxide or a chelate compound of aluminum in essentially an organic solvent capable of dissolving the component;
b) adding an aqueous solution containing (a) at least one compound of a metal belonging to Group VIB of the Periodic Table and (b) at least one compound of a metal belonging to Group VIII of the Periodic Table to the resulting solution; and
c) drying and calcining an effective component resulting from step b).

12. The process for producing a catalyst composition for the hydrodesulfurization of a hydrocarbon oil as claimed in claim 1 or 2, wherein the process further comprises:
a) mixing an stirring a mixture of (c) an aluminum alkoxide or a chelate compound of aluminum, (a) at least one compound of a metal belonging to Group VIB of the Periodic Table, (b) at least one compound of a metal belonging to Group VIII of the Periodic Table, and essentially an organic solvent capable of dissolving those components, to thereby obtain a homogeneous solution;
b) adding water to the resulting solution; and
c) drying and calcining an effective component resulting from step b).

13. A catalyst composition for the hydrodesulfurization of a hydrocarbon oil produced by the process of claim 3, comprising a composite of metal oxides comprising aluminum; and
   at least one metal selected from a group consisting of
      (A) at least one metal belonging to Group VIB of the Periodic Table; and
      (B) at least one metal belonging to Group VIII of the Periodic Table;
   wherein the at least one metal belonging to Group VIB of the Periodic Table accounts for, in terms of oxide, from 10 to 60% by weight with respect to the total catalyst, and wherein the at least one metal belonging to Group VIII of the Periodic Table accounts for, in terms of oxide, from 3 to 20% by weight with respect to the total catalyst.

14. A catalyst composition for the hydrodesulfurization of a hydrocarbon oil produced by the process of claim 4, comprising a composite of metal oxides comprising aluminum; and
   at least one metal selected from a group consisting of
      (A) at least one metal belonging to Group VIB of the Periodic Table; and
      (B) at least one metal belonging to Group VIB of the Periodic Table accounts for, in terms of oxide, from 10 to 60% by weight with respect to the total catalyst, and wherein the at least one metal belonging to Group VIII of the Periodic Table accounts for, in terms of oxide, from 3 to 20% by weight with respect to the total catalyst.

15. The process for producing a catalyst composition for the hydrodesulfurization of a hydrocarbon oil as claimed in claim 3, wherein the step a) further comprises:
   a) mixing and stirring a mixture of (c) and aluminum alkoxide or a chelate compound of aluminum, (a) at least one compound of a metal belonging to Group VIB of the Periodic Table, and essentially an organic solvent capable of dissolving those components, to thereby obtain a homogeneous solution;
   b) adding water to the resulting solution;
   drying and calcining an effective component resulting from step b); and
   c) adding to the product obtained in step b) at least one compound belonging to Group VIII of the Periodic Table, followed by drying and calcining the resulting product.

16. The process for producing a catalyst composition for the hydrodesulfurization of a hydrocarbon oil as claimed in claim 4, wherein the step a) further comprises:
   a) mixing and stirring a mixture of (c) an aluminum alkoxide or a chelate compound of aluminum, (b) at least one compound of a metal belonging to Group VIII of the Periodic Table, and essentially an organic solvent capable of dissolving those components, to thereby obtain a homogeneous solution;
   b) adding water to the resulting solution;
   drying and calcining an effective component resulting from step b); and
   c) adding to the product obtained in step b) at least one compound belonging to Group VIB of the Periodic Table, followed by drying and calcining the resulting product.

17. The process for producing a catalyst composition for the hydrodesulfurization of a hydrocarbon oil as claimed in claim 1, 2, 3, or 4 wherein, at least one of an alkoxide or chelate compound of silicon, titanium, zirconium, boron, gallium, magnesium, or hafnium is used as a partial substitute of the aluminum alkoxide or the chelate compound of aluminum.

18. The process for producing a catalyst composition for the hydrodesulfurization of a hydrocarbon oil as claimed in claim 1, 2, 3 or 4, wherein, the aluminum alkoxide is aluminum methoxide, aluminum ethoxide, aluminum isopropoxide, aluminum n-butoxide, or aluminum sec-butoxide.

19. The process for producing a catalyst composition for the hydrodesulfurization of a hydrocarbon oil as claimed in claim 1, 1, 3, or 4, wherein, the chelate compound of aluminum is aluminum (ethyl-acetoacetate) di-(iso-propylate), aluminum acetoacetatediburtoxide, aluminum tris(acetylacetonare), or aluminum bis(ethylacetoacetate) mono-(acetylacetonate).

20. The process for producing a catalyst composition for the hydrodesulfurization of a hydrocarbon oil as claimed in claim 1, 2, 3 or 4, wherein, the essentially an organic solvent capable of dissolving the aluminum alkoxide or the chelate compound of aluminum and the compounds of metals belonging to Group VIB or to Group VIII of the Periodic Table, is an alcohol, an ether, a ketone, or an aromatic group compound.

21. The process for producing a catalyst composition for the hydrodesulfurization of a hydrocarbon oil as claimed in claim 1, 2, 3 or 4, wherein, the essentially an organic solvent capable of dissolving the aluminum alkoxide or the chelate compound of aluminum and the at least one compound of metals belonging to Group VIB or to Group VIII of the Periodic Table is acetone, methanol, ethanol, n-propanol, iso-propanol, n-butanol, iso-butanol, hexanol, benzene, toluene, xylene, diethyl ether, tetrahydrofuran, or dioxane, which may be used either singly or as a mixture thereof.

22. The process for producing a catalyst composition for the hydrodesulfurization of a hydrocarbon oil as claimed in claim 1, 2, 3 or 4, wherein, the compounds of at least one metal belonging to Group VIB of the Periodic Table and the compound of at least one metal belonging to Group VIII of the Periodic Table are nitrates, chlorides, sulfates, acetates, acetylacetonates, or ammonium salts of the metal acids thereof.

23. The process for producing a catalyst composition for the hydrodesulfurization of a hydrocarbon oil as claimed in claim 1, 2, 3 or 4, wherein,
   the aqueous solution of the at least one compound of a metal belonging to Group VIB of the Periodic Table is obtained by dissolving, ammonium paramolybdate, ammonium bichromate, or ammonium para tun9state, into deionized water, and the aqueous solution of the compound of the at least one metal belonging to Group VIII of the Periodic Table is obtained by dissolving, cobalt nitrate hexahydrate, cobalt chloride hexahydrate, nickel nitrate hexahydrate, or nickel chloride hexahydrate, into deionized water.

24. The process for producing a catalyst composition for the hydrodesulfurization of a hydrocarbon oil as claimed in claim 9, wherein the mixed solution comprises from about 50 to about 98% by weight (in terms of oxides) of the aluminum alkoxide or the chelate compound of aluminum and from about 50 to about 2%by weight (in terms of oxides) of the at least one compound of a metal belonging to Group VIII of the Periodic Table.

25. The process for producing a catalyst composition for the hydrodesulfurization of a hydrocarbon oil as claimed in claim 10, wherein the mixed solution comprises from about 32 to about 96% by weight in terms of oxides) of the aluminum alkoxide or the chelate compound of aluminum and from about 68 to about 4% by weight (in terms of oxides) of the at least one compound of a metal belonging to Group VIB of the Periodic Table.

26. A catalyst composition for the hydrodesulfurization of a hydrocarbon oil produced by the process of claim 2, comprising a composite of metal oxides comprising aluminum; and at least one metal selected from a group consisting of (A) at least one metal belonging to Group VIB of the Periodic Table; and
(B) at least one metal belonging to Group VIII of the Periodic Table;

wherein the at least one metal belonging to Group VIB of the Periodic Table accounts for, in terms of oxide, from 10 to 60% by weight with respect to the total catalyst, and wherein the at least one metal belonging to Group III of the Periodic Table accounts for, in terms of oxide, from 3 to 20% by weight with respect to the total catalyst.

* * * * *